ations in apparatus for releasing fish hooks from an obstruction and for releasing or disgorging a hook from a fish.

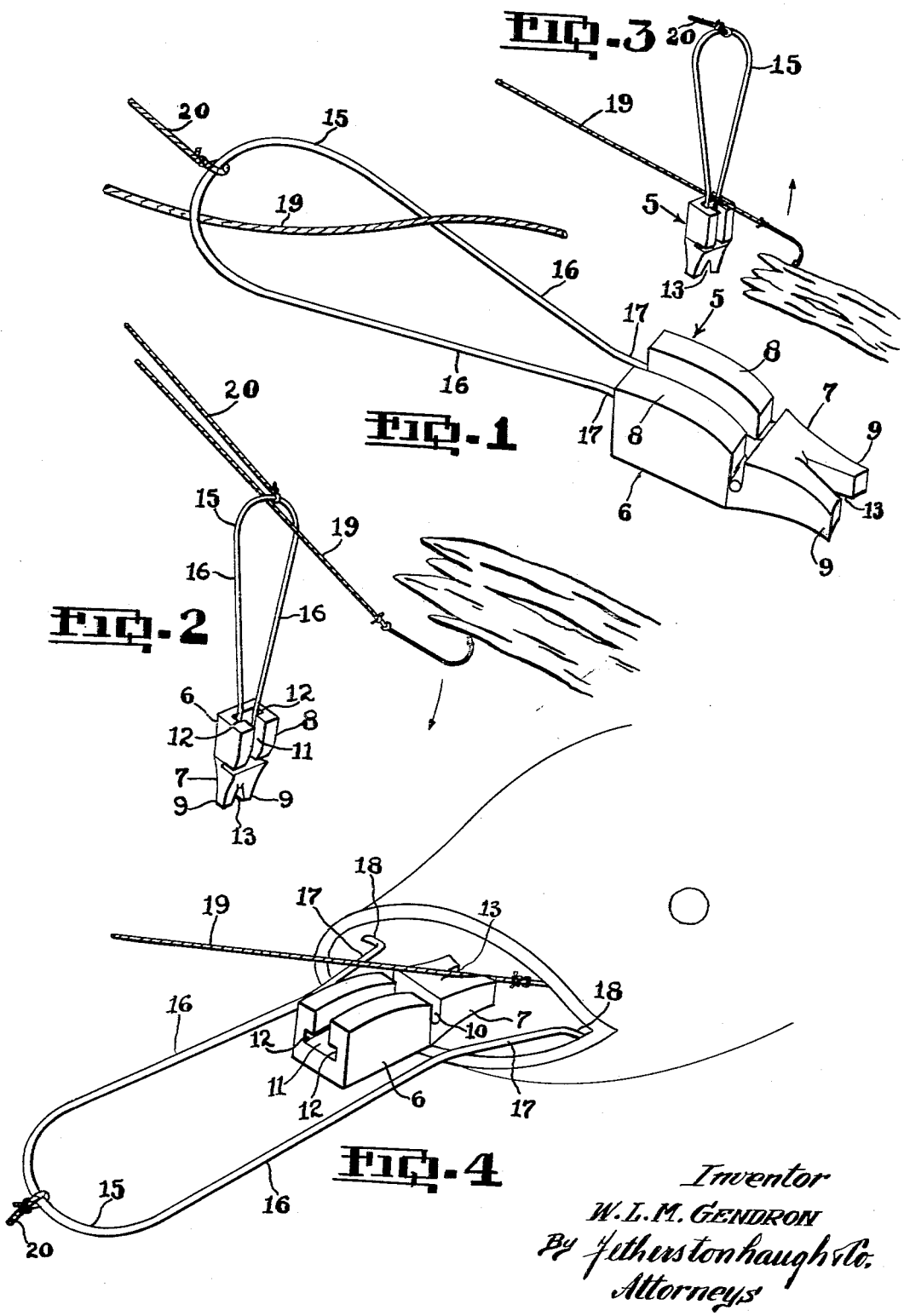

One of the objects of this invention is to provide a novel weighted apparatus which can be readily and conveniently applied to a fishing line for sliding movement therealong to the hook end to detach the fish hook from any under-water obstruction with which it has become entangled.

Another object of this invention is to provide an apparatus including a fishing line engaging loop which is detachably secured in a novel manner to a weighted end for sliding along the fish line.

A further object is to provide a loop of spring action construction, having leg members resiliently biasable to divergent positions and being movable against the biasing thereof for detachable engagement with a weighted end.

A still further object of this invention is to provide an apparatus with a weighted end of novel construction to serve as a disgorging implement for facilitating the removal of a fish hook from the inside of a fish.

The above and other objects and characteristic features of this invention will be understood more readily from the following detailed description taken in connection with the accompanying drawings, in which:

Fig. 1 is a perspective view of a combination hook releasing and disgorging apparatus embodying my invention.

Fig. 2 is a view illustrating one application of the apparatus shown in Fig. 1.

Fig. 3 is a view illustrating another application of the apparatus shown in Fig. 1.

Fig. 4 is a view illustrating still another application of the apparatus shown in Fig. 1.

Referring more particularly to the drawings, 5 designates a block of metal or other suitable weighty material shaped to provide a substantially thickened section 6 and a tapered section 7. The thickened section 6 is substantially rectangular in cross-section at its outer end and presents right-angularly disposed side, bottom and outer end wall surfaces and an upper wall surface 8 inclined toward the tapered section 7. The tapered section 7 tapers toward its outer end along the top and side surfaces with the outer marginal portions of its side surfaces flaring outwardly as indicated at 9.

The upper face of block 5 is provided with a T-shaped channel including a head portion 10 extending transversely across block 5 substantially along the dividing line of the block sections 6 and 7, and a stem portion 11 extending longitudinally from the transverse head portion 10 to the outer end of thickened section 6. Stem portion 11 is also provided with side grooves 12 extending the full length thereof adjacent the bottom of the stem portion of the channel. The free end of section 7 is notched to provide a V-shaped recess 13 of substantial depth.

A U-shaped loop 15 of spring wire having its legs 16 normally biased to open position is provided with lower leg extensions 17 bent outwardly to be divergent in the open position and in parallel relation when the legs are closed against the biasing of the wire. Lower leg extensions 17 have their terminal portions bent to provide laterally extending, oppositely disposed feet 18.

To employ the apparatus for releasing fish hooks from on obstruction, the loop 15 is first placed with its bail portion in a position of straddling a fishing line 19. The lower legs 17 are then compressed together against the spring biasing of the loop and are inserted into the longitudinal stem portion of the T-shaped channel of block 5 with the feet 18 in the transverse head portion 10 of the channel. By releasing the compression on legs 17, the spring biasing of the loop will force legs 17 into the side grooves 12 retaining the legs therein under pressure. A line 20 on the bail portion of loop 15 will then permit sliding movement of the apparatus along the fishing line 19 with the weighted block 5 in suspension.

If the hook is snagged, as illustrated in Fig. 2, to the underside of an obstruction, the weight of the apparatus together with the force of the downward sliding motion will apply sufficient pressure against the bill of the hook intended to withdraw the hook barb from engagement with the obstruction. If, as shown in Fig. 3, the hook is snagged with its barb down, a lifting motion is applied to the line 20 of the apparatus when the latter is adjacent the hook, to disengage said hook. It will be noted that the leg extensions 17 when in grooves 12 provide a slight gap therebetween sufficient to allow the line 19 to be freely engaged by the upper end of the block 5 during the lifting operation. Thus the line 19 is not wedged between leg extensions 17 and the apparatus can be freely retracted along line 19 without necessitating reeling-in of the fishing line 19 to remove the apparatus.

One method of using the apparatus to release a hook from the mouth of a fish is illustrated in Fig. 4. In this case the loop 15 is separated from block 5 and inserted in the mouth of a fish so that the feet 18 act to expand the mouth of the fish. The notched end 13 of the block is then engaged with the fishing line 19, as shown, and is moved along the line to engage and exert releasing pressure against the bill of the hook.

Alternately, in releasing a hook from the mouth of a fish, the loop 15 may be left assembled with block 5, as shown in Fig. 1, and used as a handle for forcing the block inwardly along the fishing line 19 (see Fig. 4) and into releasing engagement with the bill of the hook.

When engaged with the block 5, loop member 15 is substantially pear-shaped with legs 16 being inwardly directed from the bail portion to the slightly gapped leg extensions 17. The ends of legs 16 adjacent the bail portion should be spaced apart enough to permit a plug or lure to pass therebetween. However, with the legs 16 being in substantial V-formation, when it is desired to engage a plug or lure for recovery it will be wedged between the legs 16. This is important upon occasions when the hook is snagged at such an angle that the weight of the apparatus will not release it and tugging on the line will result in breaking of the line. With the plug or lure wedged between the legs 16, and a stout line attached to the apparatus, recovery of the plug or lure is ensured.

Having described what is now believed to be a preferred embodiment of my invention, it will be understood that the invention is not limited to same, but that changes and modifications may be resorted to within the scope and spirit of the invention as defined in the appended claims.

I claim:

1. Apparatus for releasing fish hooks from an obstruction comprising a block of weighty material having one side face recessed to provide a T-shaped channel therein having its head portion extending transversely across said side face intermediate the ends of the block and its stem portion extending along the central portion of said side face from the head portion to one end face of the block, and a loop member including a bail portion and substantially straight elongated legs extending from one side of said bail portion, said legs being removably inserted through said side face and fitted in said T-shaped channel in pressure retaining engagement with the sides of its stem portion and with the bail portion of said loop projecting beyond the outer end of the stem portion of said channel.

2. Apparatus as set forth in claim 1, in which the side walls of the stem portion of the channel are undercut to provide opposing full-length grooves immediately adjacent the bottom of the stem portion of said channel to receive therein the legs of said loop member.

3. Apparatus as set forth in claim 1, in which said loop member comprises a spring wire and has its legs normally biased to divergent positions, said legs being compressible against said spring biasing action to positions of close proximity for removable insertion of said legs in said channel through said side face.

4. Apparatus as set forth in claim 1, in which said legs are shaped intermediate their length to provide leg extensions remote from the bail portion of said loop member which are normally divergent, said loop member being compressible to position said leg extensions in adjacent parallel relationship for removable fitting of said leg extensions through said side face into said channel.

5. Apparatus as set forth in claim 1, in which said loop member comprises a spring wire having its legs normally biased to divergent positions, said legs being compressible against said biasing to positions of engagement with said block with said legs being inwardly directed from the bail portion to positions of close proximity at their outer extremities, and said loop member being characterized in that, in its block engaging position, the bail portion is of a dimension capable of passing a plug or lure therethrough, whereas movement of a plug or lure in a direction toward the outer extremities of the legs will provide wedging of said plug or lure therebetween.

6. Apparatus for releasing fish hooks from an obstruction comprising a block of weighty material provided with a transverse groove extending inwardly from one exposed face and across the entire width of the block, said block also being provided intermediate its width with a longitudinal groove extending inwardly from the same exposed face of said block at one side of the transverse groove, said longitudinal groove extending from the transverse groove to one end face of the block, the end of the block at the side of the transverse groove remote from the longitudinal groove being notched, said longitudinally extending groove having the opposing side walls thereof undercut adjacent the bottom of the groove to give said longitudinal groove an inverted T-shaped cross-section, and a U-shaped bail member having the free ends of its legs directed outwardly, the legs of said bail member being positioned in the recesses formed by the undercut portions of the side walls of the longitudinal groove with the outwardly directed ends of the legs positioned in the end portions of the transverse groove, the arrangement being such that the bail member may be released from the block by forcing the legs toward each other to free them from said recesses and then moving said legs in the direction of the exposed face portion of the block into which the grooves open.

References Cited in the file of this patent

UNITED STATES PATENTS

| | | |
|---|---|---|
| 1,094,568 | Hornich, Jr. | Apr. 28, 1914 |
| 2,074,057 | Kempe | Mar. 16, 1937 |
| 2,453,245 | McDonald, Jr. | Nov. 9, 1948 |
| 2,561,281 | Lawrence | July 17, 1951 |